Nov. 20, 1934.   D. E. THOMAS   1,981,291
TIRE CHAIN APPLYING AND REMOVING MECHANISM
Original Filed Sept. 7, 1932   7 Sheets-Sheet 4
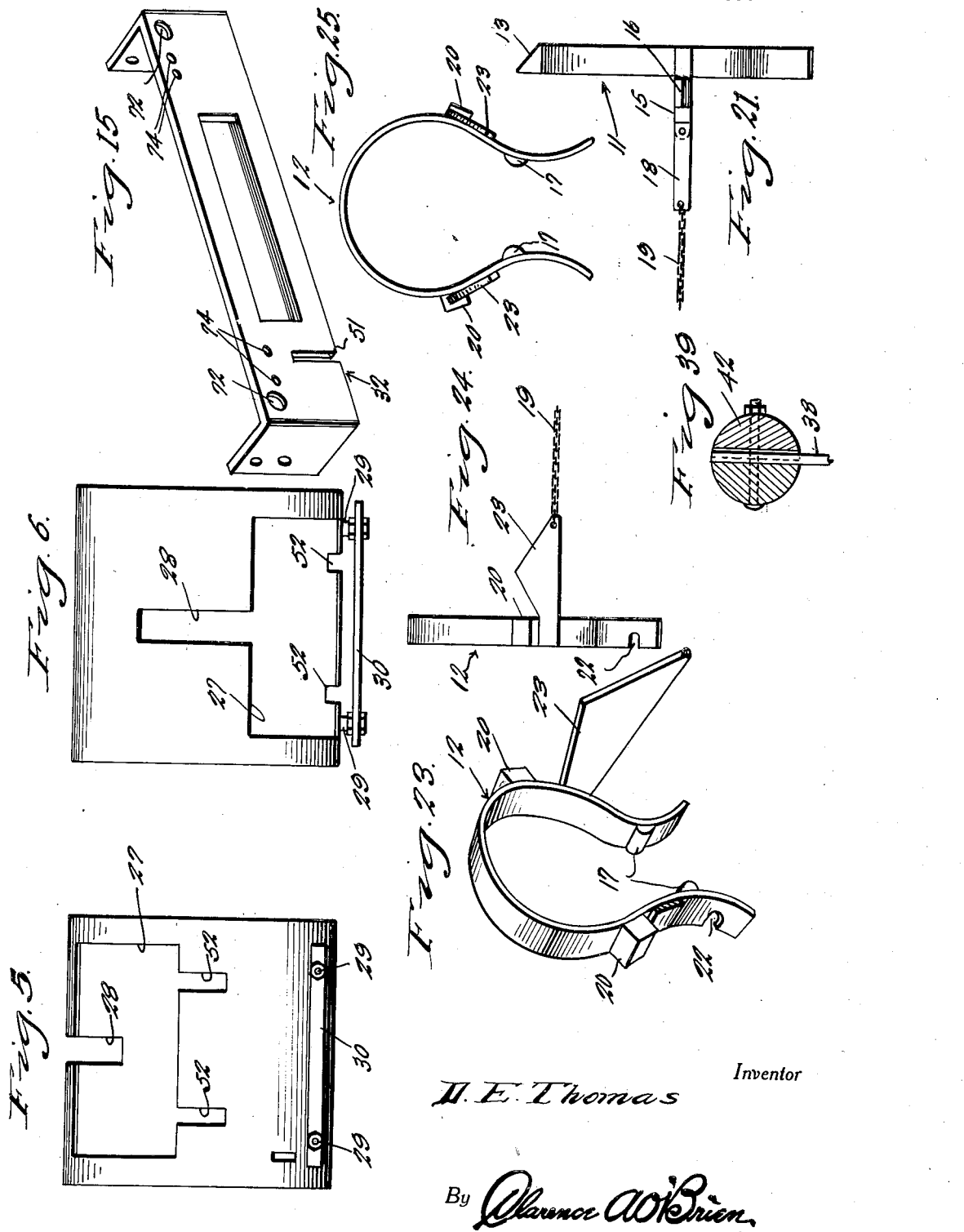
Inventor
D. E. Thomas
By Clarence A. O'Brien
Attorney Nov. 20, 1934.　　　D. E. THOMAS　　　1,981,291
TIRE CHAIN APPLYING AND REMOVING MECHANISM
Original Filed Sept. 7, 1932　　7 Sheets-Sheet 5
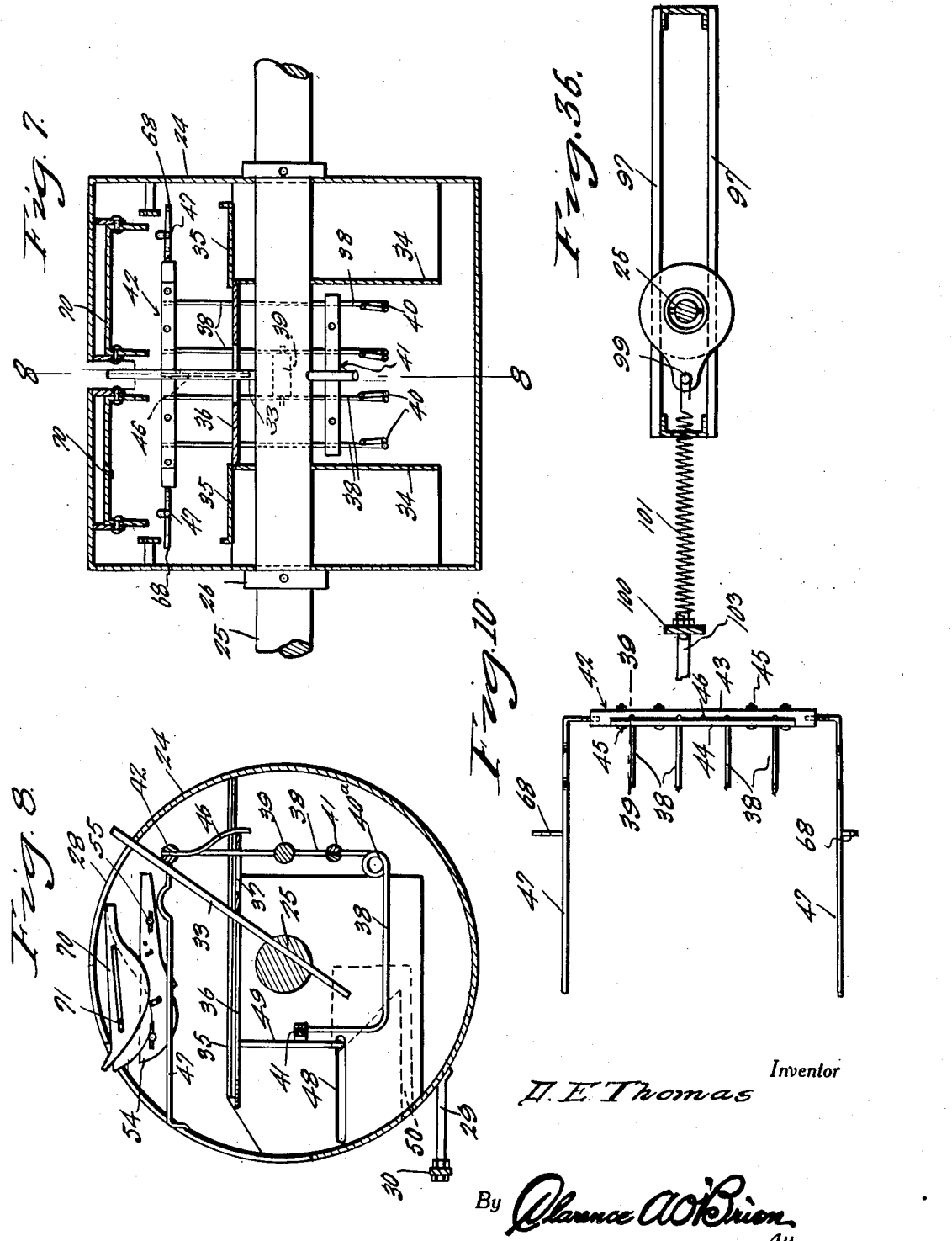
Inventor
*D. E. Thomas*
By *Clarence A. O'Brien*
Attorney

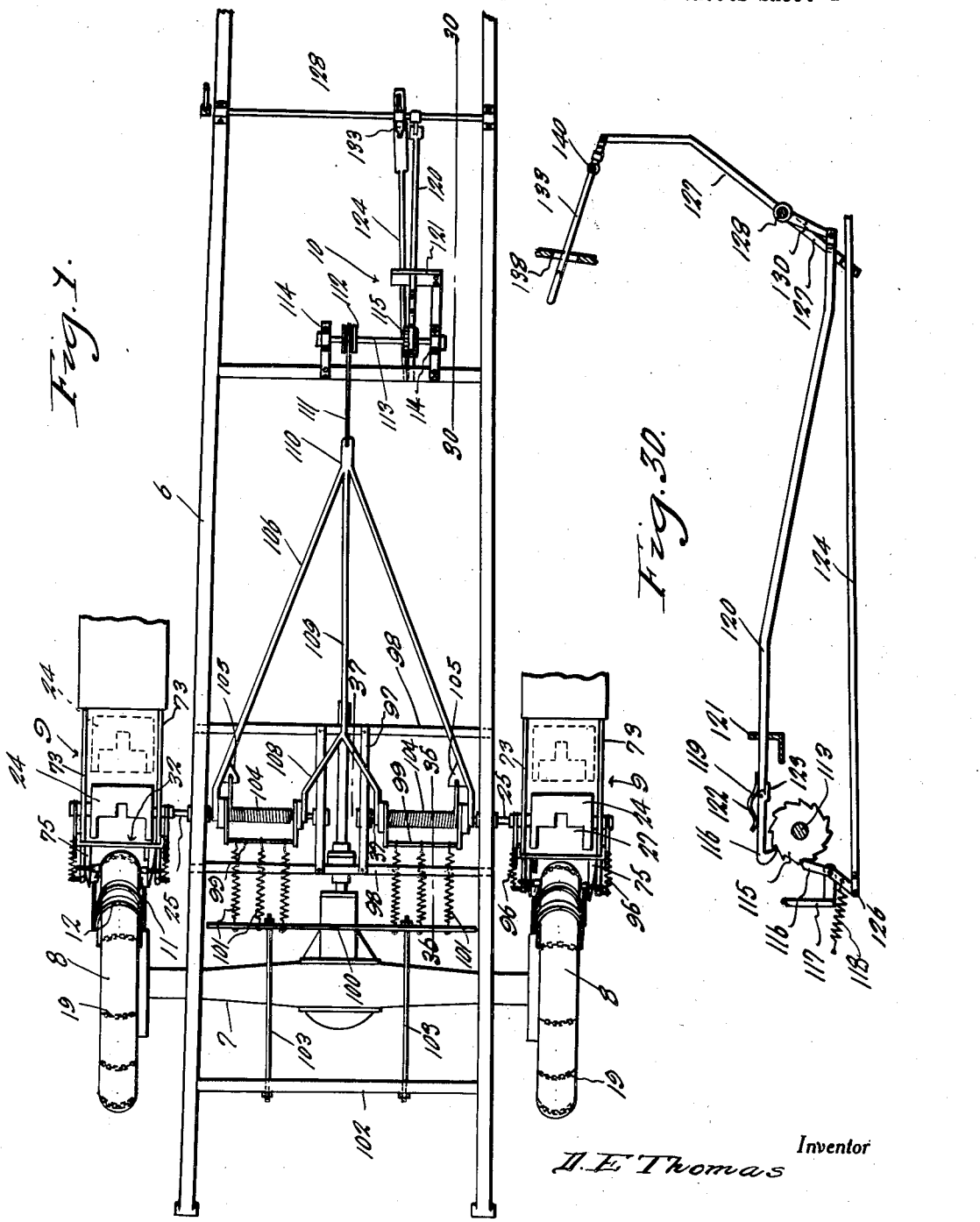

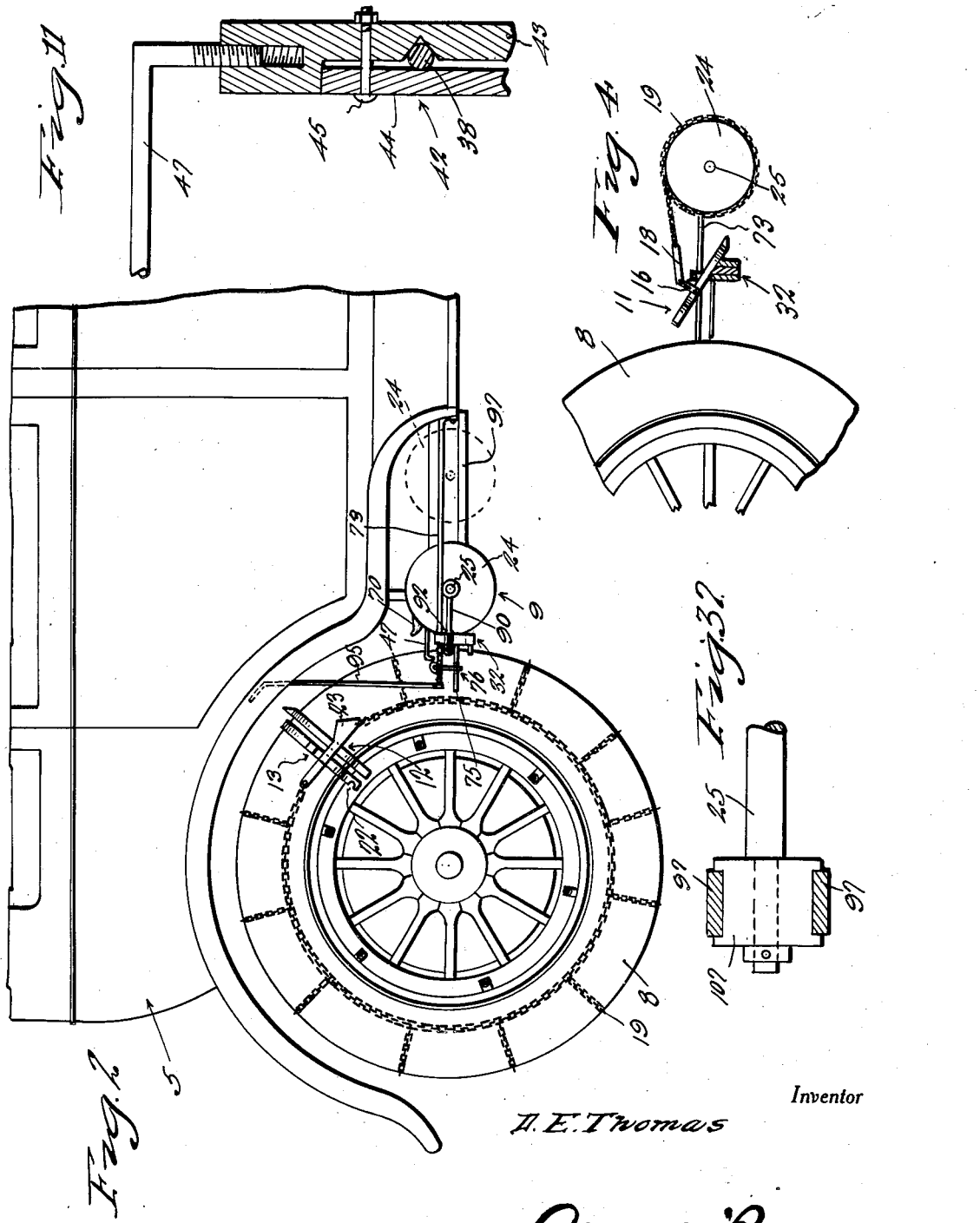

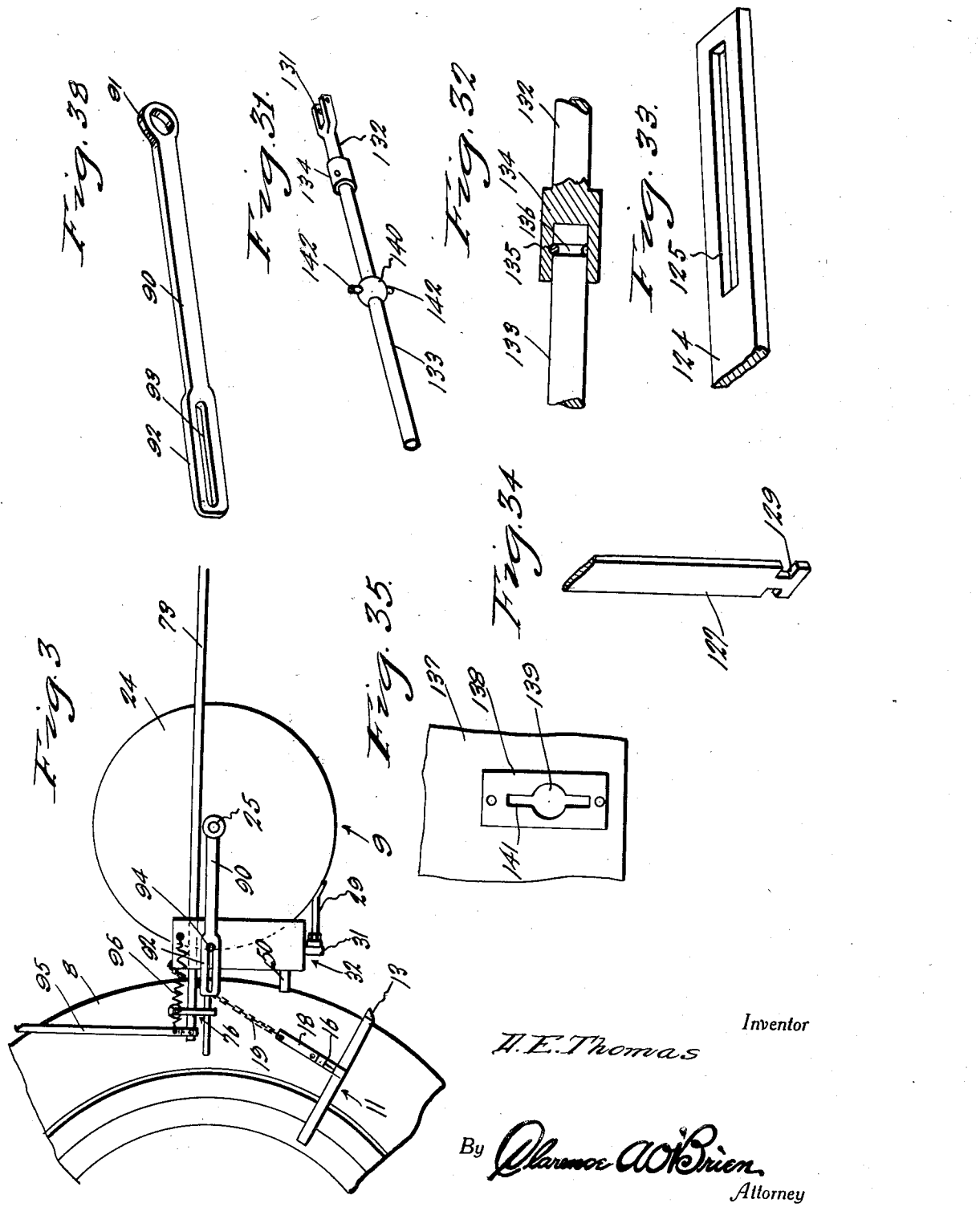

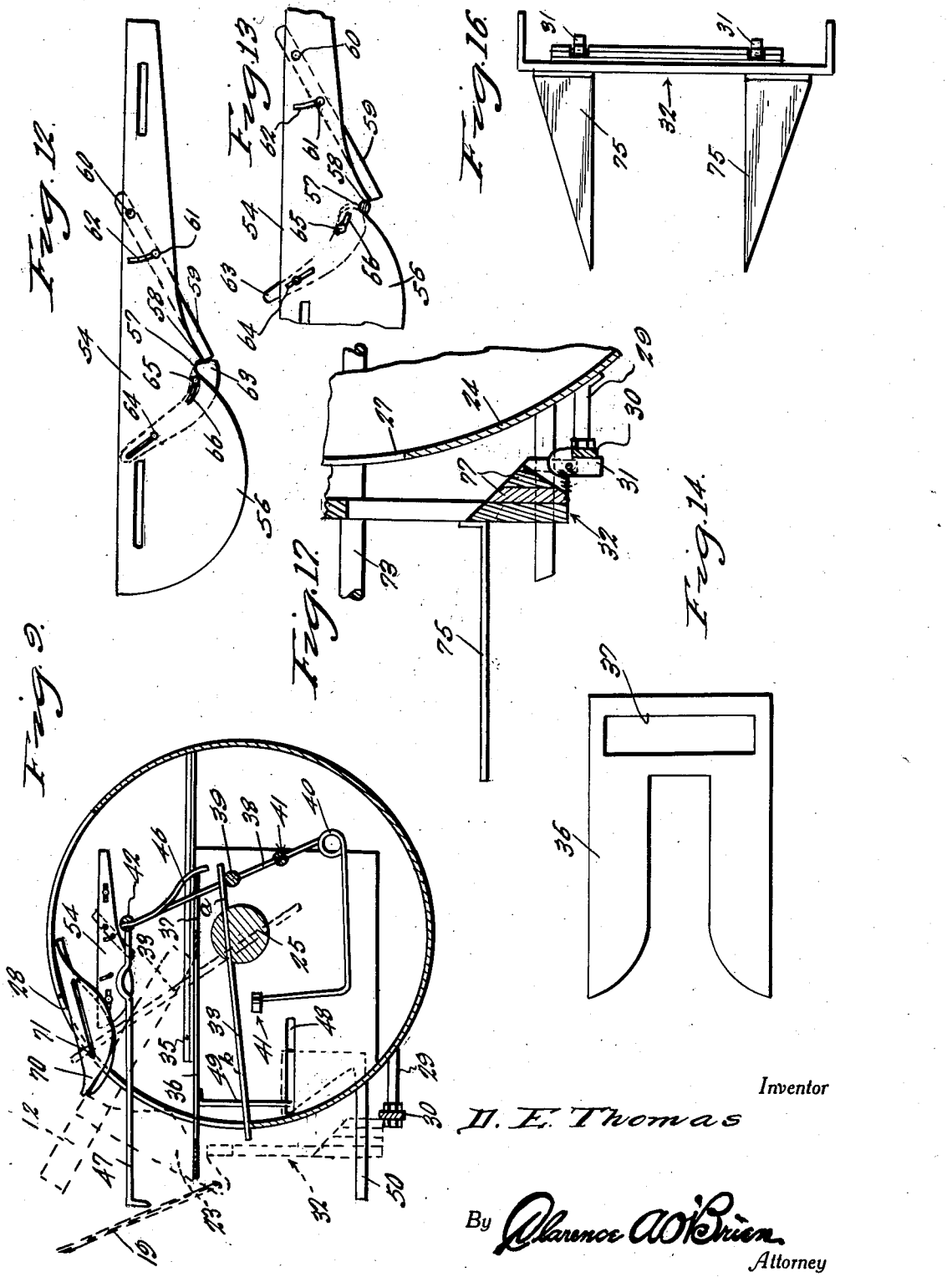

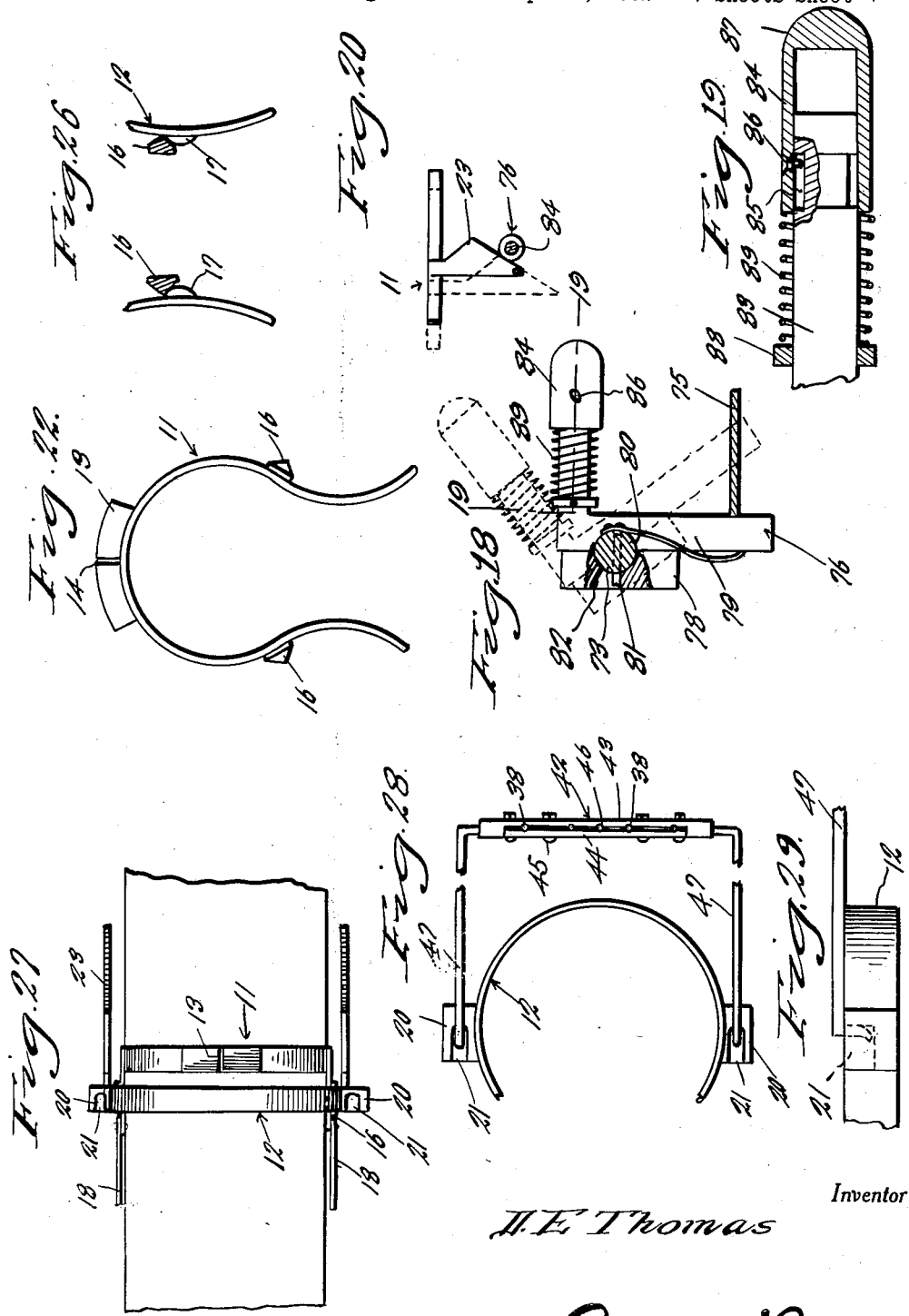

Patented Nov. 20, 1934

1,981,291

UNITED STATES PATENT OFFICE 1,981,291

TIRE CHAIN APPLYING AND REMOVING MECHANISM

Doctor E. Thomas, Fairmont, W. Va.

Application September 7, 1932, Serial No. 632,034
Renewed October 9, 1934

4 Claims. (Cl. 152—14)

This invention appertains to new and useful improvements in tire chains and more particularly to means whereby a tire chain can be easily applied and with equal ease removed.

Another important object of the invention is to provide an automatic tire chain applying and removing mechanism which will dispense with outside manual operation in applying and removing tire chains.

These and numerous other important objects of the invention will become apparent to the reader of the following specification.

In the drawings:—

Figure 1 represents a top plan view fragmentarily showing the chassis of an automobile along with its rear wheels and showing the novel chain applying and removing mechanism in its entirety.

Fig. 2 represents a fragmentary side elevational view of the rear portion of an automobile, showing the mechanism after a chain has been applied.

Fig. 3 represents a fragmentary side elevational view of one of the applying and removing units, showing the primary clamp in place as the chain is about to be applied.

Fig. 4 represents a fragmentary detailed sectional view showing the primary clamp in retracted position.

Fig. 5 represents a rear elevational view of the drum.

Fig. 6 represents a top plan view of the drum.

Fig. 7 represents a vertical sectional view through the drum with the rod 33 removed.

Fig. 8 represents a vertical transverse sectional view through the drum.

Fig. 9 represents another transverse sectional view through the drum showing in dotted lines the secondary clamp about to leave the drum.

Fig. 10 represents a top plan view of the spring means in the drum.

Fig. 11 represents a fragmentary detailed sectional view of the spring means in Fig. 10.

Fig. 12 represents a side elevational view of the hook retaining catch.

Fig. 13 represents a fragmentary side elevational view of the catch showing in operated position.

Fig. 14 represents a top plan view of the conveyor plate.

Fig. 15 represents a perspective view of the primary clamp trap.

Fig. 16 represents a top plan view of the clamp trap.

Fig. 17 represents a fragmentary detailed sectional view through the clamp trap and drum.

Fig. 18 represents a sectional view through the fulcrum.

Fig. 19 represents a sectional view taken substantially on line 19—19 of Fig. 18.

Fig. 20 represents a diagrammatic view disclosing the secondary clamp engaged with the fulcrum.

Fig. 21 represents a side elevational view of the primary clamp.

Fig. 22 represents an elevational view of the primary clamp.

Fig. 23 represents a perspective view of the secondary clamp.

Fig. 24 represents a side elevational view of the secondary clamp.

Fig. 25 represents an elevational view of the secondary clamp.

Fig. 26 represents a fragmentary detailed sectional view disclosing the engagement of the secondary clamp with the primary clamp.

Fig. 27 represents a top plan view of an automobile tire showing the primary and secondary clamps in connected relation.

Fig. 28 represents a fragmentary top plan view disclosing the secondary clamp and its retracting means.

Fig. 29 represents a fragmentary side elevational view of the means shown in Fig. 28.

Fig. 30 represents a sectional view taken substantially on line 30—30 of Fig. 1.

Fig. 31 represents a perspective view of the control rod for setting the drum.

Fig. 32 represents a fragmentary detailed sectional view disclosing a swivel connection between sections of the rods shown in Fig. 31.

Fig. 33 represents a fragmentary perspective view of the slotted bar.

Fig. 34 represents a fragmentary perspective view of the rider cooperative with the slotted bar shown in Fig. 33.

Fig. 35 represents a fragmentary front elevational view of the key-slot plate with which the rod in Fig. 31 cooperates.

Fig. 36 represents a sectional view taken substantially on line 36—36 of Fig. 1.

Fig. 37 represents a fragmentary detailed sectional view taken substantially on line 37—37 of Fig. 1.

Fig. 38 represents a perspective view of one of the primary clamp trap supporting bars.

Fig. 39 represents a sectional view taken substantially on line 39—39 of Fig. 10.

Referring to the drawings wherein like numerals designate like parts, it can be seen that numeral 5 generally refers to the body of an automobile which is supported in some suitable manner upon the chassis 6. (See Fig. 1.) Numeral 7 represents the rear axle housing, the axle of which is provided with the usual tired wheels 8—8.

Numerals 9—9 represent generally the novel chain applying and removing mechanism, one for each of the rear wheels, while numeral 10 generally refers to the manual control which is positioned adjacent the driver's seat, whereby the mechanism 9—9 can be set for operation.

In carrying out the present invention, it will be observed that two tire clamps are provided, one being designated as the primary clamp because it is first to be placed on the tire, while the other is referred to as the secondary clamp because it is placed on the tire of the wheel subsequently. The primary clamp is designated generally by numeral 11, while the secondary clamp is generally referred to by numeral 12. The clamp 11 consists of a horse-shoe shaped leaf spring structure having its ends flared apart and provided at the outside of its bight portion with a beveled block 13 which is slit transversely at its intermediate portion as at 14 (see Fig. 22) to permit the clamp to readily flex when being applied and removed from the tire.

Each leg portion of the clamp 11 is provided with a laterally extending arm 15 having a beveled formation 16 thereon, over which the ribs 17 on the inner side of the legs of the clamp 12 can slide when the clamps are brought together for interlocking relation as shown in Fig. 27.

Each of the arms 15 has a short strap 18 pivotally connected thereto, and to this strap, the tire chain denoted by numeral 19 is connected.

The clamp denoted by numeral 12 has on the outside of its leg portion a pair of blocks 20—20 each of which is provided with a recess denoted by numeral 21 for receiving the hooks of the clamp retracting means, shown in Fig. 28. The free end portions of the legs of the clamp 12 are provided with notches 22 which can receive the rim bolts to prevent slipping of the clamp on the wheel. Each leg portion of the clamp 12 is provided with a laterally extending wedge-shaped member 23 and to the outer extremity of each of these wedge-shaped members 23, the aforementioned tire chain 19 is secured, in other words, the clamp 11, the primary clamp, is located at one end of the tire chain, while the secondary clamp 12 is located at the opposite end of the chain.

As each of the mechanisms 9 is the same in construction, a description of one will suffice for both.

Numeral 24 represents the chain drum of the mechanism 9 which is secured to the shaft 25 by collars 26, so that the drum will rotate with the shaft when contact of lock pin passing through shaft at center of drum is made with the same.

As is clearly shown in Figs. 5 and 6 the drum is provided with a longitudinally extending opening 27 through which the secondary clamp is movable and a circumferentially extending slot 28 merging at one end with the opening 27.

Secured to the drum 24 by the arm 29 is the abutment bar 30 which is capable of abutting the catch member 31 on the primary clamp strap generally referred to by numeral 32. This serves to set the drum for discharging or receiving the secondary clamp 12.

Extending through the shaft 25 and located in the center portion of the drum 24 is the pin 33 which is provided with an inwardly extending portion $a$ and an outwardly extending end portion $b$ which extends through the slot 28 in the drum 24 and which is also operative across the opening 27.

Numerals 34—34 represent spaced partitions in the drum 24 suitably secured to the drum so as to rotate therewith and each of these partitions 34 has a shelf structure 35 at one end thereof. Located between the partitions 34—34 and slidably interposed between the corresponding shelves 35—35 is the conveyor plate 36, which as shown in Fig. 14, is of substantially U-shape having the end portions of its legs beveled on their inner sides, while the back portion is provided with a transversely extending slot 37.

Extending through the slot 37 of the conveyor plate 36 are the wire springs 38, preferably four in number, the intermediate pair carrying a roller 39. These wire springs 38 are coiled as at 40 and disposed laterally and anchored to the cross bar 41 which is constructed substantially the same as the cross bar generally referred to by numeral 42 in Fig. 28 as well as the connector 41$a$.

The connector 42 consists of an elongated member 43 cut away at its intermediate portion to receive the clamp plate 44 which is secured to the member 43 by bolts 45. Between the clamp plates 44 and the member 43 the free end portions of the springs 38 are clamped, along with the intermediate spring 46 which is disposed toward the conveyor plate 36 and engages against the innermost end thereof as in the manner substantially shown in Fig. 8.

The ends of the elongated member 43 of the cross bar 42 are provided with the pair of hook members 47—47 which engage with the recessed blocks 20 of the clamp generally referred to by numeral 12, when the clamp is being retracted (see Fig. 28).

As is clearly shown in Fig. 8, the partitions 34—34 are provided with blocks 48 through which the lower lateral end portions of the connectors 49 extend. These connectors are interposed between the conveyor plate 36 and the latch bolts 50 whereby the latch bolts are moved outwardly during the outward movement of the conveyor plate 36 to engage into the slots 51 on the primary clamp strap 32 for retaining the drum stabilly retained against motion while the secondary clamp is being ejected. These bolts 50 operate through the notches 52 in the drum 24.

On the inner side of each end of the drum 24 is a latch device for the hooks 47 whereby the hooks will be retained in extended position until the secondary clamp is to be retracted. Each of these latch devices consists of a plate 54 connected to the corresponding end of the drum 24 by hinged blocks 55. The outer end of the plate 54 has a curved head portion 56 and at the inner end of this curved head portion 56 is the notch 57, defining the shoulder 58. Numeral 59 represents a catch member swingable on the fulcrum 60 and which is provided with a pin 61 operating in the arcuate slot 62 of the plate 54.

Located adjacent the notch 57 is the transversely movable member 63 having a pin and slot connection 64 and a pin 65 operating in the arcuate slot 66.

In referring to Fig. 10 it will be seen that each of the hooks 47 is provided with a pintle 68 extending outwardly and capable of riding against the rockable member 59. As the hooks ride outwardly, these pintles 68 ride against the rockable members 59 and force the same upwardly and as the pin rides over the free end of the member 59, the latter will gravitate and this free end will serve as a guide to direct the pintle into the notch 57 where it will rest against the shoulder 58.

The pin will remain in this position until the same is dislodged by force exerted against the slidable member 63. The plates designated by numerals 70—70 are rockably and slidably supported by pins and slots 71 and immediately adjacent the catches last described and these guide the secondary clamp outwardly.

The primary clamp trap consists of a U-shaped structure 32 having openings 72—72 therein for receiving the guide rods 73—73.

Numeral 74 represents openings in the trap for receiving securing elements whereby the outwardly extending wedges 75 are secured to the trap, these wedges 75 being operative to actuate the fulcrums, one of which is generally referred to by numeral 76 in Fig. 18. The corner portion of the trap 32 is thickened by supplemental plates 77 and these are beveled to form a rest for the primary clamp 11 as shown in Fig. 4.

The aforementioned fulcrum 76 of which there are two, serves to guide the secondary clamp onto the tire by permitting the corresponding wedge 23 on the clamp to ride against the same.

The fulcrum consists of a pair of bars 78—79 fused together and provided with a bore 80 for receiving one of the aforementioned guide rods 73 from which extends a pin 81 operating in the slot 82 of the bar or block 78 to limit the motion of the bars 78—79. The bar 79 at its upper end is provided with a cylindrical extension 83 which has a tubular roller 84 on the outer end thereof. The outer end of the cylindrical extension 83 is provided with a relatively wide circumferentially extending channel 85 which receives the internal projection 86 on the roller 84. The outer end portion of the roller 84 is solid as at 87 and of hemispherical shape.

Interposed between the inner end of the roller 84 and the stationary collar 88 on the cylindrical extension 83 is the coiled compressible spring 89 for normally maintaining the roller 84 extended outwardly, yet permitting tensional motion of the same inwardly in the event the same strikes against the wheel while the latter is in operation.

On each side of the drum 24 a bar 90 is mounted with its eyelet end 91 receiving loosely the shaft 25 while its opposite end is enlarged as at 92 and provided with a longitudinally extending slot 93 which receives a pin 94 on the corresponding side of the primary clamp strap 32.

Extending downwardly from the overlying fender of the automobile body is a brace rod 95 connected to each of the guide rods 73, while interposed between each side of the trap 32 and the corresponding brace rod 95 is a coiled compressible spring 96.

By reference to Fig. 1 of the drawings, a transverse frame or support for the drum shaft is clearly shown and denoted by numerals 98—98. This transverse frame terminates on the top of the lower flanges of the channel bars of the chassis frame of the automobile. At the points of termination of said transverse frame, and as close as possible to the inclines of the aforesaid chassis frame, a drop yoke is riveted and drops far enough below the frame to permit the drum shaft with roller or ball bearings to travel back and forth freely under the chassis frame of the automobile. This eliminates boring opening through the chassis frame.

On the shaft 25 and between the ends of the yoke 99 is the portion 104 one end of which is secured to the shaft while the other end is secured to the lug 105, the latter being located on one end portion of the V-shaped frame 106 which is common to both mechanisms 9. This is a pulling frame for the drums of the mechanisms 9—9.

As is clearly apparent in Fig. 1 and shown in detail in Fig. 36, the bearings 107 through which the shaft 25 is journaled are slidably mounted on the chassis 6 and the bridge members 97.

A V-shaped member 108 has its end portion secured to the innermost end of the shafts of the mechanisms 9—9 and its apex is connected by the bar 109 to the apex portion of the frame 106, the latter being provided with a shank 110 to which is connected the rear end of the cable 111. This cable is wound on the drum 112, the latter being located on the shaft 113 generally through the bearings 114. This shaft 113 carries a sprocket wheel 115 with which the claw 116 is engageable as well as the pivotal dog 116, the latter being mounted on the bracket 117 and maintained normally engaged with the sprocket wheel 115 by the spring 118.

This claw 116 is pivotally connected as at 119 to the elongated rod 120 slidably disposed through the guide 121 and a leaf spring 122 on the rear end of the rod 120, serves to urge the claw 116 downwardly into engagement with the wheel 115, yet the small plate 123 serves to limit the downward movement of the claw whenever the claw passes over the wheel and is free thereof.

Numeral 124 is an elongated bar provided at its forward end with the slot 125, while its rear end is pivotally connected as at 126 to the dog 116. Numeral 127 represents an elongated rockable bar, rockable on the fulcrum 128, and this is provided with a notched end 129 which is slidable in the groove 125 of the bar 124.

Numeral 130 represents a lever extending from the bar 127 and to the lower end of which is connected pivotally the forward end of the bar 120. The upper end of the bar 127 is offset and is pivotally connected to the yoke 131 of the section 132 of the operating rod 133. This section 132 is provided with a socket 134 internally grooved to receive the ring 135 which engages into the circumferential groove 136 on the received end of the rod 133.

Referring to Fig. 35 it can be seen that the instrument board 137 of the automobile has an opening therein over which the plate 138 is disposed. This plate has an opening 139 therein through which the rod 133 in the ball or enlargement 140 is slidable. The plate 138 is provided also with slots 141 for matching the pintles 142 on the enlargement 140.

In operating the invention to apply the chain, the control rod 133 is rotated so that the enlargement 140 and the pintle 142 can pass through the plate 138 on the dashboard. A long pull backwardly will result in the engagement of the bar 127 with the bar 124 at the forward end of the slot 125 from which will disengage the dog 116 from the ratchet wheel 115. This releases the frame 106 and the drum 24 moves backwardly toward the corresponding wheel 8 rapidly. The drum with the chain 19 thereon strikes the primary clamp 11 (see Fig. 4) and drives the same off of the inclined portion of the trap 32. The clamp is driven onto the tire 8 in about the same angle as it is shown in Fig. 4 and as the wheel 8 rotates, the drag of the chain 19 will straighten out the clamp on the wheel.

Referring to Fig. 3, it can be seen, that as the wheel 8 rotates, the chain 19 will pay off of the drum 24 as the drum 24 rotates, and as the end of the chain on the drum exerts pull on the secondary clamp within the drum 24, the drum 24 is pulled toward the wheel 8 so that the bar 30 engages the catches 31 (see Fig. 17) to prevent any further rotation of the drum as the secondary clamp is now ready to leave the drum.

As the chain 19 exerts pull on the secondary clamp 12, the same begins to leave the drum 24. As the pull of the chain is in an upward direction momentarily, the clamp will assume the position shown in dotted lines shown in Fig. 9. Furthermore, due to the engagement of the guide 70 and the drag or tension of the pin 33, the clamp 12 will leave the drum 24 in the inclined position shown in Fig. 9. However, when it is about to be applied to the wheel and has passed over the primary clamp trap 32, it will be pulled downwardly against the fulcrum 76 and as its wedges 23 begin to ride on the rollers 84 of the fulcrum, the clamp is partly jambed on the wheel. The motion of the wheel swinging the clamp downwardly, results in the pressure of the wedges 23 against the fulcrum rollers 84 with the result that the clamp is entirely forced onto the wheel and over the primary clamp, so that the ribs 17 on the secondary clamp pass over the beveled portions 16 of the primary clamp, to the end that the clamps are interlocked together.

By now working the control rod 133, the ratchet wheel with the assistance of the core 116 can be rotated slightly so as to feed the drum 24 forwardly a slight distance away from the wheel, but not to the dotted line position shown in Fig. 2, which is the inoperative position of the drum.

When it is desired that the chain be removed, the rod 133 is again actuated to release the dog 116, whereupon the drum and trap will return to a position in close proximity to the wheel. It can be seen, that the beveled blocks 13 on the primary clamp 11 is capable of forcing the trap 32 backwardly toward the drum as it passes by the trap, and when this position has been secured, the car is backed up. This backing up motion of the wheel brings the primary clamp up under the clamp trap, and as the arc is sufficient to permit the beveled blocks 13 to miss the lower portion of the trap, the same will strike the upper portion of this trap at the opening therein and as the motion of the wheel continues, the primary clamp is pulled into the trap to assume the position shown in Fig. 4.

However the secondary clamp is the first to be moved and this is accomplished by the hooks 47 (see Fig. 9) which protrude outwardly and which are released when the pressure of the secondary clamp is exerted against the same, thereby releasing the springs 38, so that the springs will pull the hooks 47 inwardly as the pins 33 swing backwardly in which operation the clamp is brought into the drum, the bolting means 50 is released, and the drum starts to rotate, winding thereon the chain, at the end of which is the primary clamp which is strapped in the manner afore described. To tension the frame 106 and associated elements rearwardly, springs 101 connect the frame 106 to the cross bar 100, the bar 100 being in turn connected by the rods 103 to the rear chassis strut 102.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

1. An automobile tire chain applying and removing mechanism comprising a primary spring clamp, a secondary spring clamp, a tire chain interposed between the clamps, means for applying and removing the clamps in sequence, said means including a drum and hook members for catching one of the clamps to start the chain onto the drum, a torque spring for the drum, and latch means for retaining the drum in spring tensioned position when the chain is applied.

2. A side chain applying and removing mechanism comprising a pair of spring clamps, a tire chain interposed between the clamps and secured thereto, a mobile rotary drum upon which the chains can be wound, said drum being operative to drive one of the clamps onto the wheel, means associated with the drum for removing the clamp, and wedge means for driving the other clamp onto the wheel.

3. An automobile tire chain changing mechanism comprising a primary spring clamp, a secondary spring clamp, a tire chain interposed between and connected to the said clamps at its ends, means for applying and removing the clamps in sequence, said means including a hollow drum having an opening in the side thereof whereby the drum forms a trap for one of the clamps.

4. An automobile tire chain changing mechanism comprising a primary spring clamp, a secondary spring clamp, a tire chain interposed between and connected to the said clamps at its ends, means for applying and removing the clamps in sequence, said means including a hollow drum having an opening in the side thereof whereby the drum forms a trap for one of the clamps, and manual means for feeding the said drum toward and away from the wheel with which it is to be associated.

DOCTOR E. THOMAS.